(12) United States Patent
Araki et al.

(10) Patent No.: US 7,938,955 B2
(45) Date of Patent: May 10, 2011

(54) METHOD FOR PRODUCING SUPER-LOW SULFUR GAS OIL BLENDING COMPONENT OR SUPER-LOW SULFUR GAS OIL COMPOSITION, AND SUPER-LOW SULFUR GAS OIL COMPOSITION

(75) Inventors: Yasuhiro Araki, Saiitama (JP); Katsuaki Ishida, Saiitama (JP)

(73) Assignee: Japan Energy Corporation, Tokyo (JP)

( * ) Notice: Subject to any disclaimer, the term of this patent is extended or adjusted under 35 U.S.C. 154(b) by 379 days.

(21) Appl. No.: 11/793,209

(22) PCT Filed: Dec. 21, 2005

(86) PCT No.: PCT/JP2005/023469
§ 371 (c)(1), (2), (4) Date: Jun. 18, 2007

(87) PCT Pub. No.: WO2006/070660
PCT Pub. Date: Jul. 6, 2006

(65) Prior Publication Data
US 2007/0261994 A1 Nov. 15, 2007

(30) Foreign Application Priority Data
Dec. 28, 2004 (JP) .................................. 2004-378832

(51) Int. Cl.
*C10G 45/04* (2006.01)
*C07C 7/12* (2006.01)

(52) U.S. Cl. ................. 208/216 R; 208/208 R; 208/209; 208/213; 208/217; 208/243; 208/244; 208/295; 585/820; 585/823; 585/850; 585/852; 585/848; 502/304; 502/307

(58) Field of Classification Search .............. 208/208 R, 208/209, 213, 216 R, 217, 243, 244, 295; 585/820, 823, 850, 852, 848; 502/304, 307
See application file for complete search history.

(56) References Cited

U.S. PATENT DOCUMENTS

| | | | | |
|---|---|---|---|---|
| 3,649,525 A | * | 3/1972 | Hilfman | 208/210 |
| 3,674,680 A | * | 7/1972 | Hoekstra et al. | 208/111.3 |
| 3,876,532 A | * | 4/1975 | Plundo et al. | 208/216 R |
| 4,052,296 A | * | 10/1977 | Montagna | 208/216 R |
| 4,300,999 A | * | 11/1981 | Davies et al. | 208/212 |
| 4,389,304 A | * | 6/1983 | Eastman et al. | 208/254 H |
| 5,302,470 A | * | 4/1994 | Okada et al. | 429/17 |
| 5,382,349 A | * | 1/1995 | Yoshita et al. | 208/49 |
| 5,454,933 A | * | 10/1995 | Savage et al. | 208/212 |
| 5,928,497 A | * | 7/1999 | Iaccino | 208/212 |
| 6,042,798 A | * | 3/2000 | Masuda et al. | 423/244.01 |
| 6,495,029 B1 | | 12/2002 | Schorfheide et al. | |
| 2002/0043484 A1 | * | 4/2002 | Khare | 208/244 |
| 2003/0111389 A1 | * | 6/2003 | Johnson et al. | 208/208 R |
| 2003/0162060 A1 | * | 8/2003 | Butler et al. | 429/17 |
| 2003/0166464 A1 | * | 9/2003 | Price et al. | 502/324 |
| 2004/0007501 A1 | * | 1/2004 | Sughrue et al. | 208/208 R |
| 2005/0023192 A1 | * | 2/2005 | Iki et al. | 208/216 R |

FOREIGN PATENT DOCUMENTS

| | | | |
|---|---|---|---|
| JP | 2000119668 A | * | 4/2000 |
| JP | 2002-249787 A | | 9/2002 |
| JP | 2003-508580 A | | 3/2003 |
| JP | 2004-74148 A | | 3/2004 |
| JP | 2004-269685 A | | 9/2004 |
| JP | 2005-264963 | | 9/2005 |
| JP | 2006063232 A | * | 3/2006 |

OTHER PUBLICATIONS

Machine translation of JP-2006-063232A—Oct. 22, 2009.*
Machine translation of JP-2000-119668A—Oct. 22, 2009.*

* cited by examiner

*Primary Examiner* — Walter D Griffin
*Assistant Examiner* — Huy-Tram Nguyen
(74) *Attorney, Agent, or Firm* — Young & Thompson

(57) ABSTRACT

Provided are a method for producing a super-low sulfur gas oil blending component or a super-low sulfur gas oil composition having a sulfur content of less than 5 mass ppm, under relatively mild conditions, without greatly increasing the hydrogen consumption and without remarkably decreasing the aromatic content; and a super-low sulfur gas oil composition having a sulfur content of less than 5 mass ppm which exhibits a high heating value, is excellent in fuel economy and output power, and is free from an adverse effect on a sealing rubber member or the like used in the fuel injection system and thus does not cause the leakage of a fuel. A method for producing a super-low sulfur gas oil blending component or a super-low sulfur gas oil composition having a sulfur content of less than 5 mass ppm is also disclosed.

8 Claims, No Drawings

US 7,938,955 B2

METHOD FOR PRODUCING SUPER-LOW SULFUR GAS OIL BLENDING COMPONENT OR SUPER-LOW SULFUR GAS OIL COMPOSITION, AND SUPER-LOW SULFUR GAS OIL COMPOSITION

TECHNICAL FIELD

The present invention relates to a method for producing a super-low sulfur gas oil blending component or a super-low sulfur gas oil composition having a sulfur content reduced to less than 5 mass ppm, and to the super-low sulfur gas oil composition.

BACKGROUND ART

In recent years, the quality regulation values of gas oil have tended to become severe worldwide in order to improve air environment. Particularly, sulfur compounds in gas oil may affect durability of post-treatment facilities which are expected as countermeasures against exhaust gas from diesel vehicles, such as an oxidation catalyst, a nitrogen oxide (NOx) reducing catalyst, and a continuous regenerative filter for removing diesel exhaust particles. A sulfur reduction in gas oil is thus desired. It is expected that the greater the sulfur reduction in gas oil, the greater the effect of suppressing production of sulfate in exhaust gas, the greater the effect of suppressing deterioration of a nitrogen-oxide reducing catalyst, and the greater the effect of reducing production of particulate matter on a post-treatment catalyst, whereby emission of nitrogen oxides and particulate matter can be reduced.

Under such a situation, efforts to develop an ultra-deep desulfurization technology which can significantly reduce sulfur content in gas oil have been undertaken. As the technology for reducing the sulfur content in gas oil, a method of employing hydrodesulfirization operating conditions that promote desulfurization, for example, increasing the reaction temperature, decreasing the liquid hourly space velocity (LHSV) and the like can be considered. However, if the reaction temperature is increased, carbonaceous materials deposit on the catalyst and the activity of the catalyst quickly decreases. On the other hand, if the LHSV is decreased, the desulfurization capability is improved. However, since the throughput is decreased, it is necessary to expand the scale of equipment to compensate for the decreased throughput. In addition, severer operating conditions excessively hydrogenate aromatics and increase hydrogen consumption, resulting in a high production cost.

A method of subjecting a hydrodesulfurized oil with a sulfur content of 5 to 10 mass ppm to deep hydrodesulfurization in the presence of a hydrodesulfurization catalyst to produce a deep-hydrodesulfurized gas oil with a sulfur content of not more than 5 mass ppm, and processing the resulting deep-hydrodesulfurized gas oil together with an unhydrodesulfurized oil and/or a hydrodesulfurized oil in the presence of a hydrodesulfurizing catalyst to obtain gas oil composition having a sulfur content of not more than 5 mass ppm and a total aromatic content of 3 to 12 vol % or not more than 10 vol % has been disclosed (Patent document 1 and 2). However, the deep-hydrodesulfurization treatment must be carried out under a high hydrogen pressure of 2 to 10 MPa, requires a large reactor due to the need of a low LHSV of 0.1 to 2 $hr^{-1}$, and involves significantly high hydrogen consumption since almost all the aromatics are hydrogenated in the reaction. Therefore the method has problem in the viewpoint of economical production. Moreover, the resulting gas oil has a low density because of reducing the total aromatic content to a level of 12 vol % or less, which leads to poor fuel consumption (mileage) and low output power due to the low calorific value of the gas oil. In addition, there is concern that the fuel is leaked by adverse affect to a seal rubber material or the like used in the fuel injection system.

The applicant of this invention has previously proposed a method for reducing the sulfur content in gas oil to 10 mass ppm or less with almost no reduction of aromatic content by adsorption desulfurization (Patent document 3). However, the adsorption desulfurization has only low capability of adsorbing sulfur and requires frequent regeneration of the adsorbent when operating over a long period of time. The method is thus uneconomical.

[Patent document 1] JP-A-2004-269683
[Patent document 2] JP-A-2004-269685
[Patent document 3] WO 03/097771

DISCLOSURE OF THE INVENTION

Problems to be Solved by the Invention

The present invention is to solve the above problems and an object of the invention is to provide a method for producing a super-low sulfur gas oil blending component or a super-low sulfur gas oil composition having a sulfur content of less than 5 mass ppm, under relatively mild conditions without greatly increasing the hydrogen consumption and without remarkably decreasing the aromatic content, and further to provide a super-low sulfur gas oil composition having a sulfur content of less than 5 mass ppm which exhibits a high calorific value, is excellent in fuel economy and output power, and is free from an adverse effect on a sealing rubber material used in a fuel injection system and thus does not cause leakage of the fuel.

Means for Solving the Problem

As a means for solving the above problems, the present invention includes the following methods and compositions.

(1) A method for producing a super-low sulfur gas oil blending component or a super-low sulfur gas oil composition comprising desulfurizing a low-sulfur gas oil fraction with a sulfur content of 5 to 50 mass ppm by causing the low-sulfur gas oil fraction to come in contract with a porous desulfurization agent having a sulfur-sorbing function in the presence of hydrogen to reduce the sulfur content to less than 5 mass ppm.

(2) A method for producing a super-low sulfur gas oil blending component or a super-low sulfur gas oil composition comprising desulfurizing a low-sulfur gas oil fraction with a sulfur content of 2 to 50 mass ppm by causing the low-sulfur gas oil fraction to come in contract with a porous desulfurization agent having a sulfur-sorbing function in the presence of hydrogen to reduce the sulfur content to not more than 1 mass ppm.

(3) A method for producing a super-low sulfur gas oil blending component or a super-low sulfur gas oil composition comprising desulfurizing a low-sulfur gas oil fraction with a sulfur content of 5 to 50 mass ppm by causing the low-sulfur gas oil fraction, which is obtained by causing a gas oil fraction to come in contract with a hydrodesulfurization catalyst containing element(s) of Group 6A and Group 8 of the periodic table in the presence of hydrogen, to come in contact with a porous desulfurization agent having a sulfur-sorbing function in the presence of hydrogen to reduce the sulfur content to less than 5 mass ppm.

(4) A method for producing a super-low sulfur gas oil blending component or a super-low sulfur gas oil composition comprising desulfurizing a low-sulfur gas oil fraction with a sulfur content of 2 to 50 mass ppm by causing the low-sulfur gas oil fraction, which is obtained by causing a gas oil fraction to come in contract with a hydrodesulfurization catalyst containing element(s) of Group 6A and Group 8 of the periodic table in the presence of hydrogen, to come in contact with a porous desulfurization agent having a sulfur-sorbing function in the presence of hydrogen to reduce the sulfur content to 1 mass ppm or less.

(5) The method according to any one of (1) to (4) above, wherein the porous desulfurization agent having a sulfur-sorbing function contains at least one metal selected from the group consisting of copper, zinc, nickel and iron.

(6) A super-low sulfur gas oil composition having a sulfur content of less than 5 mass ppm, comprising the super-low sulfur gas oil blending component produced by the method according to any one of (1), (3) and (5) above.

(7) A super-low sulfur gas oil composition having a sulfur content of not more than 1 mass ppm, comprising the super-low sulfur gas oil blending component produced by the method according to any one of (2), (4) and (5) above.

(8) A super-low sulfur gas oil composition having a sulfur content of less than 5 mass ppm and an aromatic content of 13 to 30 mass %, and more preferably, a density at 15° C. of 0.80 to 0.87 g/cm$^3$ and a net calorific value of not less than 34.5 MJ/L.

EFFECT OF THE INVENTION

The method for producing a super-low sulfur gas oil blending component or a super-low sulfur gas oil composition of the present invention has particular effects of reducing the sulfur content to less than 5 mass ppm without unduly decreasing the aromatic content under comparatively mild conditions, reducing hydrogen consumption, and thus reducing the production cost.

Since the sulfur content of the super-low sulfur gas oil composition of the present invention is less than 5 mass ppm, preferably less than 2 mass ppm, and still more preferably not more than 1 mass ppm, the super-low sulfur gas oil composition can lessen the burden on the environment by reducing the amount of sulfur oxides in exhaust gas, and reducing the emission of nitrogen oxides and particulate matter by suppressing deterioration of a nitrogen oxide reducing catalyst and inhibiting the growth of particulate matter on post-treatment catalyst. In addition, when used as a fuel for vehicles, the super-low sulfur gas oil composition exhibits particular effects of reduced fuel consumption and an increased operating power due to the high calorific value, and of causing no fuel leakage due to its characteristics of having no adverse effect on sealing rubber materials used in fuel injection systems.

BEST MODE FOR CARRYING OUT THE INVENTION

Desulfurization Using Desulfurization Agent with Sulfur-Sorbing Function

In the method for producing a super-low sulfur gas oil blending component or a super-low sulfur gas oil composition of the present invention, a method of causing a low-sulfur gas oil fraction to come in contact with a porous desulfurization agent having a sulfur-sorbing function in the presence of hydrogen is used.

The porous desulfurization agent having a sulfur-sorbing function used in the present invention is an agent that can immobilize sulfur atoms in organic sulfur compounds on the desulfurization agent and can release hydrocarbon residues in the organic sulfur compounds from the agent by cleaving the carbon-sulfur bonds of the organic sulfur compounds. When the hydrocarbon residues are released, hydrogen that is present in the system is added to the carbon atom separated by the cleavage of the carbon-sulfur bond. Therefore, the hydrocarbon compounds can be obtained as a product resulting from removal of sulfur atoms from the organic sulfur compounds. The hydrocarbon compounds removed sulfur atoms may be further subjected to a reaction such as hydrogenation, isomerization, decomposition, and/or the like. On the other hand, since sulfur is immobilized on the desulfurization agent, no sulfur compound such as hydrogen sulfide that is produced in hydrodesulfurizing process is produced as a product.

Although there are no specific limitations to the porous desulfurization agent inasmuch as such an agent has a sulfur-sorbing function, a porous desulfurization agent containing at least one metal selected from the group consisting of copper, zinc, nickel, and iron is preferable, with zinc and nickel being particularly preferable. A preferable desulfurization agent contains 0.5 to 85 mass %, preferably 1 to 80 mass % of a metal component such as copper. Such a desulfurization agent can be easily prepared by a method of impregnating a porous carrier such as alumina with a metal component such as copper and calcining the porous carrier supported with the metal component, and a method of precipitating a metal component such as copper together with carrier component such as aluminum (co-precipitation), forming the resulting solid, and calcining the formed product. The co-precipitation method is particularly preferable since the co-precipitation method allows a large amount of metal component(s) effective for desulfurization such as copper to be incorporated in the desulfurization agent, thereby extending the service life of the desulfurization agent. The amount of metal(s) to be supported thereon can be increased by further impregnating the formed and calcined porous desulfurization agent with a metal component and calcining again. The calcined porous desulfurization agent obtained by calcining may be used as is. However, it is more preferable to use it after a reduction treatment in a hydrogen atmosphere.

The porous desulfurization agent preferably has a specific surface area of 30 m$^2$/g or more, and particularly 50 to 600 m$^2$/g. Such a porous desulfurization agent as disclosed in JP-3324746, JP-3230864, and JP-A-11-61154 can also be used.

Either a batch process or a continuous flow process can be employed for the desulfurization treatment using the porous desulfurization agent. A method of continuously feeding hydrogen and a feed oil to a fixed bed continuous flow reactor loaded with the porous desulfurization agent possessing a sulfur-sorbing function and causing the hydrogen and the feed oil fraction to come in contact with the porous desulfurization agent is preferable. The desulfurization temperature can be selected from the range 0 to 400° C., preferably 100 to 380° C., and still more preferably 200 to 350° C. The desulfurization could be carried out under a pressure of 10 MPa or less, preferably 5 MPa or less, more preferably 3 MPa or less, and particularly preferably 2 to 3 MPa. When a gas oil fraction is caused to come in contact with a porous desulfurization agent in a fixed bed continuous flow reactor, the LHSV is preferably selected from the range 0.01 to 10,000 hr$^{-1}$, more preferably 1 to 100 hr$^{-1}$, still more preferably 2 to 30 hr$^{-1}$, and particularly preferably 3 to 10 hr$^{-1}$. The hydrogen/ oil feed ratio can be selected from the range 0.01 to 10,000 NL/L, preferably 0.02 to 1,000 NL/L, more preferably 10 to 500 NL/L, and particularly preferably 100 to 500 NL/L.

In the method for producing a super-low sulfur gas oil blending component or a super-low sulfur gas oil composition of the present invention, the sulfur content of the obtained super-low sulfur gas oil blending component or super-low sulfur gas oil composition is less than 5 mass ppm, preferably less than 2 mass ppm, and more preferably not more than 1 mass ppm. The sulfur content is the smaller the better. For this reason, the sulfur content of the low sulfur gas oil fractions to be subjected to the sorption desulfurization is 5 to 50 mass ppm, preferably 5 to 30 mass ppm, and particularly preferably 5 to 10 mass ppm when producing the super-low sulfur gas oil blending component or the super-low sulfur gas oil composition with a sulfur content of less than 5 mass ppm; and 3 to 50 mass ppm, preferably 3 to 30 mass ppm, and particularly preferably 3 to 10 mass ppm when producing the super-low sulfur gas oil blending component or the super-low sulfur gas oil composition with a sulfur content of less than 2 mass ppm. In the case of producing the super-low sulfur gas oil blending component or the super-low sulfur gas oil composition with a sulfur content of not more than 1 mass ppm, the sulfur content of the low sulfur gas oil fraction(s) is 2 to 50 mass ppm, preferably 2 to 30 mass ppm, and particularly preferably 2 to 10 mass ppm.

The purity of hydrogen to be used in the desulfurization treatment with a porous desulfurization agent is preferably 50 vol % or more, more preferably 80 vol % or more, and particularly preferably 95 vol % or more. If the hydrogen purity is less than 50 vol %, a large hydrogen compressor is unpreferably required. During the desulfurization treatment using a porous desulfurization agent, it is preferable not to include sulfur compounds such as hydrogen sulfide and carbonyl sulfide as impurities in hydrogen as much as possible, because the sulfur compounds decrease the sorption capacity of the sorbent. The sulfur concentration in hydrogen used in the desulfurization treatment is 1 vol % or less as sulfur element, preferably 0.1 vol % or less, and particularly preferably 0.01 vol % or less.

(Hydrodesulfurization Using Hydrodesulfurization Catalyst)

A gas oil fraction obtained by distillation of crude oil in a petroleum refinery usually has a sulfur content of 5,000 to 20,000 mass ppm. If the gas oil fraction is processed by a porous desulfurization agent having sulfur-sorbing capability as is, the life of the porous desulfurization agent is unpreferably remarkably shortened. For this reason, in the case of producing a super-low sulfur gas oil blending component with a sulfur content of less than 5 mass ppm, the gas oil fraction is subjected to a desulfurization treatment to reduce the sulfur content to 5 to 50 mass ppm prior to the desulfurization treatment using a porous desulfurization agent. Although any method can be used for reducing the sulfur content to 5 to 50 mass ppm insofar as the method can reduce the sulfur content to this range, a hydrodesulfurization treatment using a hydrodesulfurization catalyst is preferable. In the case of producing a super-low sulfur gas oil blending component with a sulfur content of not more than 1 mass ppm, the gas oil fraction is desulfurized to reduce the sulfur content to 2 to 50 mass ppm. Although any method can be used for reducing the sulfur content to 2 to 50 mass ppm insofar as the method can reduce the sulfur content to this range, a hydrodesulfurization treatment is preferably used.

As the hydrodesulfurization catalyst used for the hydrodesulfurization treatment, a catalyst containing element(s) of Group 6A and Group 8 of the periodic table is suitably used. As the element(s) of Group 6A of the periodic table, molybdenum or tungsten is preferable; and as the element(s) of Group 8 of the periodic table, nickel or cobalt is preferable. The element(s) of Group 6A and Group 8 of the periodic table are preferably supported on an inorganic porous oxide carrier and used. As the inorganic porous oxide carrier, oxide(s) of element(s) of Group 2, Group 4, Group 13 and Group 14 of the periodic table can be used. (The periodic table herein refers to the periodic table based on IUPAC Recommendations 1990.) Among these, silica, alumina, magnesia, zirconia, boria, calcia, and the like are suitable. These inorganic porous oxide carriers can be used either alone or in combination of two or more. Particularly preferable inorganic porous oxide carriers include alumina (having a crystal structure such as γ-alumina, δ-alumina, η-alumina, and χ-alumina), silica alumina, silica, alumina-magnesia, silica-magnesia, and alumina-silica-magnesia.

The inorganic porous oxide carriers can be easily obtained by preparing an inorganic hydrous oxide by a coprecipitation method, a kneading method, or the like, and forming, and drying and calcining the formed inorganic hydrous oxide.

A spray impregnation method, an immersing method, or the like is suitably used for causing a metal component to be supported on the carrier. A particularly preferable method is a pore-filling method in which the inorganic porous oxide carrier is impregnated with a solution in an amount equivalent to the water absorption of the carrier. In order to control supporting conditions of the metal, it is preferable that an organic compound or an organic salt be present together with in the solution for supporting the metal. After impregnating the solution containing the metal component(s) and the like, the inorganic porous oxide carrier is dried at 50 to 180° C., preferably 80 to 150° C., for 10 minutes to 24 hours. The supporting and drying operation may be repeated in order to support a larger amount of metal component(s) and the like. After supporting a desired amount of metal component(s) and the like, the inorganic porous oxide carrier is dried and the dried inorganic porous oxide carrier is calcined to obtain a hydrodesulfurization catalyst precursor. The calcining is carried out in a range preferably from 400 to 600° C., and particularly preferably from 450 to 580° C., the time required for rising to the calcining temperature is 10 to 240 minutes, and the time maintaining the inorganic porous oxide carrier at the calcining temperature is preferably 1 to 240 minutes.

(Presulfiding of Hydrodesulfurization Catalyst)

Active sites can be formed from the hydrodesulfurization catalyst precursor for a hydrodesulfurization catalyst by being subjected to presulfiding. The presulfiding is usually carried out after loading the hydrodesulfurization catalyst precursor in a hydrodesulfurization reactor. The presulfiding is carried out by gradually increasing the temperature, while causing a sulfiding agent to pass through the hydrodesulfurization catalyst precursor, to an ultimate presulfiding temperature, which is not more than 450° C., and preferably from 100 to 400° C., in a hydrogen atmosphere under a hydrogen partial pressure which is equivalent to or higher than the normal pressure. As the sulfiding agent, a petroleum distillate containing a sulfur compound, a petroleum distillate containing a sulfur compound to which a sulfur-containing compound is added, or hydrogen sulfide is used. There are no specific limitations to the sulfur-containing compound to be added to the petroleum distillate insofar as the sulfur-containing compound may be converted into hydrogen sulfide under the sulfiding conditions. Thiols, carbon disulfide, thiophenes, dimethyl sulfide, dimethyl disulfide, and various polysulfides are preferably used. After loading the hydrodesulfurization catalyst precursor in the reactor, the precursor may be dried in order to remove water attached thereto before starting the presulfiding. This drying can be carried out, under a hydrogen or an inert gas atmosphere, by flowing the hydrogen or the inert gas under the normal pressure or higher at normal temperature to 220° C., preferably 200° C. or less.

There are no specific limitations to the reactor used for the hydrodesulfurization using the hydrodesulfurization catalyst. For example, a batch reactor, a continuous flow reactor, a fixed bed reactor, or a fluidized bed reactor can be used. A method of continuously feeding hydrogen and a feed oil to a fixed bed continuous flow reactor loaded with the hydrodesulfurization catalyst and causing the hydrogen and the feed oil to come in contact with the catalyst is preferable. The hydrodesulfurization is preferably carried out under the conditions of a reaction temperature of 100 to 500° C. and preferably 200 to 450° C., a hydrogen partial pressure of 0.1 to 30 MPa and preferably 2 to 20 MPa, a hydrogen/oil ratio of 50 to 2,000 NL/L and preferably 100 to 1,000 NL/L, and a LHSV of 0.05 to 20 $hr^{-1}$ and preferably 0.1 to 10 $hr^{-1}$.

Low sulfur gas oil produced by the hydrodesulfurization using the hydrodesulfurization catalyst contains hydrogen sulfide produced due to the desulfurization and dissolved therein. The hydrogen sulfide is removed as much as possible preferably before the desulfurization using a porous desulfurization agent so that it may not adversely affect the sulfur-sorbing capacity of the porous desulfurization agent in the subsequent desulfurization with the porous desulfurization agent. Although there are no specific limitations to the method for removing hydrogen sulfide, stripping by injecting a gas or steam which does not contain hydrogen sulfide, distillation, removal by an adsorbent, and the like can be used either alone or in combination.

(Gas Oil Fraction)

The gas oil fraction used as the raw material in the method for producing a super-low sulfur gas oil blending component or a super-low sulfur gas oil composition of the present invention preferably has a sulfur content of 0.5 mass % or more, usually 0.5 to 5 mass %, particularly preferably 1 to 2 mass %, a nitrogen content of 50 mass ppm or more, particularly preferably 80 to 500 mass ppm, and a density (15° C.) of 0.80 to 0.90 $g/cm^3$.

As the gas oil fraction, a straight-run gas oil fraction is preferably used, and the fraction is used either alone or in a mixture with a thermally cracked oil or a catalytically cracked oil. The straight-run gas oil fraction is obtained by atmospheric distillation of crude oil and has a 10 vol % recovered temperature of 200 to 290° C., a 50 vol % recovered temperature of 260 to 320° C., and 90 vol % recovered temperature of 300 to 370° C., approximately.

Thermally cracked oil refers to a light fraction obtained by a cracking reaction which is mainly a radical reaction induced by heating a heavy oil fraction, for example, the fraction obtained by delayed coking, visbreaking, fluid coking, and the like can be given. Although all of the obtained fractions may be used as the thermally cracked oil, it is preferable to use the fractions having a recovered temperature in the range of 150 to 520° C.

Catalytically cracked oil refers to a gas oil fraction obtained when causing middle distillates and heavy fractions, such as vacuum gas oil fractions and atmospheric distillation reside to come in contact with a zeolite catalyst, particularly a cracked gas oil fractions obtained as a by-product in a fluid catalytic cracking unit for the purpose of producing a high octane gasoline. This fraction is generally collected separately as a light catalytically cracked oil having a comparatively low boiling point and a heavy catalytically cracked oil having a comparatively high boiling point. Although both of these fractions may be used in the present invention, the light catalytically cracked oil of the former, i.e. a light cycle oil (LCO), is more preferable. The LCO generally has a 10 vol % recovered temperature of 200 to 250° C., a 50 vol % recovered temperature of 250 to 290° C., and a 90 vol % recovered temperature of 300 to 355° C. The heavy catalytically cracked oil, i.e. a heavy cycle oil (HCO), generally has a 10 vol % recovered temperature of 280 to 340° C., a 50 vol % recovered temperature of 390 to 420° C., and a 90 vol % recovered temperature of 450° C. or more.

(Super-Low Sulfur Gas Oil Composition)

The super-low sulfur gas oil composition of the present invention has a sulfur content of less than 5 mass ppm, preferably less than 2 mass ppm, and more preferably not more than 1 mass ppm. The sulfur content is measured according to the method specified in ASTM D5453 (ultraviolet fluorescence method).

The aromatic content is from 13 to 30 vol %, preferably from 15 to 28 vol %, and more preferably from 17 to 25 vol %. If the aromatic content is less than 13 vol %, unpreferably the calorific value decreases, resulting in low fuel consumption (mileage). If the aromatic content is more than 30 vol %, the amount of particulate matter discharged from engines unpreferably increases. The aromatic content is measured by the method specified in JPI-5S-49-97.

The polycyclic aromatic content, which is the content of aromatics having two or more rings, is preferably 5 vol % or less, more preferably 1 to 4 vol %. If the polycyclic aromatic content is more than 5 vol %, the amount of particulate matter discharged from engines unpreferably increases. The content of polycyclic aromatics with two or more aromatic rings is measured by the method specified in JPI-5S-49-97.

The 90 vol % recovered temperature is preferably not more than 360° C., more preferably not more than 350° C. If the 90 vol % recovered temperature exceeds 360° C., the amount of particulate matter discharged from engines unpreferably increases. The 90 vol % recovered temperature is measured by the method specified in JIS K 2254.

The density at 15° C. is preferably 0.80 to 0.87 $g/cm^3$, more preferably 0.82 to 0.86 $g/cm^3$, and particularly preferably 0.83 to 0.85 $g/cm^3$. If the density at 15° C. is less than 0.80 $g/cm^3$, the calorific value decreases, unpreferably resulting in a decrease in fuel consumption and acceleration performance. If the density at 15° C. is more than 0.87 $g/cm^3$, the particulate matter concentration of exhaust gas unpreferably increases. The density at 15° C. is measured by the method specified in JIS K 2249.

The net calorific value is preferably 34.5 MJ/L or more, more preferably 35 MJ/L or more. If the net calorific value is less than 34.5 MJ/L, the output power unpreferably decreases. The net calorific value is measured by the method specified in JIS K 2279.

The kinematic viscosity at 30° C. is preferably 1.5 to 5.0 $mm^2/s$ and more preferably 2.5 to 5.0 $mm^2/s$. If the kinematic viscosity at 30° C. is less than 1.5 $mm^2/s$, the amount of fuel injection in a diesel vehicle decreases, which may decrease the output power, and lubricity is impaired in various portions of a fuel injection pump equipped on an engine. If the kinematic viscosity at 30° C. exceeds 5.0 $mm^2/s$, the resistance inside the fuel injection system increases, and the system becomes unstable, which unpreferably leads to an increase in the concentrations of $NO_x$ and particulate matter in the exhaust gas. The kinematic viscosity at 30° C. is measured by the method specified in JIS K 2283.

The super-low sulfur gas oil composition of the present invention preferably comprises the super-low sulfur gas oil blending component in an amount of 50 vol % or more, and particularly preferably 80 vol % or more. It is possible to use the super-low sulfur gas oil blending component as the super-low sulfur gas oil composition as is. It is also possible to blend other blending components so that the super-low sulfur gas oil composition satisfies the requirements of a sulfur content of less than 5 mass ppm, preferably less than 2 mass ppm, and more preferably not more than 1 mass ppm, an aromatic content of 13 to 30 mass %, a density at 15° C. of 0.80 to 0.87 g/cm$^3$, and a net calorific value of 34.5 MJ/L or more. As examples of such other blending components, super-low sulfur kerosine with a sulfur content of 10 mass ppm or less obtained by hydrodesulfurizing straight-run kerosine, thermally cracked kerosine, catalytically cracked kerosine, or the like using a hydrodesulfurization catalyst, hydrocracked kerosine and hydrocracked gas oil obtained by hydrocracking of vacuum gas oil, and synthetic kerosine and synthetic gas oil obtained by chemical synthesis of natural gas, asphalt, or the like can be given.

As examples of additives to the gas oil, well-known fuel additives such as a low temperature fluidity improver, a antiwear agent, a cetane number improver, an antioxidant, a metal deactivator, a corrosion inhibitor and the like can be added. As examples of the low temperature fluidity improver, an ethylene copolymer and the like can be given. Particularly preferable low temperature flow improver is a vinyl ester of a saturated fatty acid such as vinyl acetate, vinyl propionate, vinyl butyrate and the like. As the antiwear agent, for example, a long chain fatty acid with a carbon number of 12 to 24 or a fatty acid ester thereof is preferably used. The antiwear property can be sufficiently improved by adding the antiwear agent in an amount of 10 to 500 ppm, preferably 50 to 100 ppm.

EXAMPLES

The present invention is described in more detail with reference to examples. However, the present invention is not limited to the following examples.

(Preparation of Low Sulfur Gas Oil)

Gas oil fraction D was obtained by blending 70 vol % of straight-run gas oil A obtained by distilling Middle East crude oil, 10 vol % of light catalytically cracked oil B obtained by hydrodesulfurizing and then catalytically cracking a vacuum gas oil fraction obtained by distilling Middle East crude oil, and 20 vol % of thermally cracked oil C obtained by thermally cracking heavy oil containing vacuum residue as a major component. The properties of these raw material gas oil fractions A, B, C and D are shown in Table 1.

CoMo/alumina (Co: 3 wt %, Mo: 13 wt %) and NiMo/alumina (Ni: 3 wt %, Mo: 12 wt %) prepared by a supporting method were loaded in a reactor tube in a volume ratio of 1:3 and, as pretreatment, presulfiding was conducted by passing gas oil containing 1 wt % of dimethyl disulfide through the reactor tube in the presence of hydrogen at 300° C. and 5 MPa.

Then, the gas oil fraction D was fed to the reactor tube and reacted under the conditions of a reaction temperature of 345° C., a hydrogen partial pressure of 7.0 MPa, a LHSV of 1.2 hr$^{-1}$, and a H$_2$/oil ratio of 440 NL/L to obtain a low sulfur gas oil E.

Example 1

A nickel-zinc complex oxide (Ni: 36 mass %, Zn: 41 mass %) prepared by the coprecipitation method was loaded in a reactor tube and subjected to a reduction treatment by flowing hydrogen gas at 300° C. for 6 hours. The low sulfur gas oil E and hydrogen were then fed to the reactor tube and reacted under the conditions of a reaction temperature of 300° C., a reaction pressure of 1.0 MPa, a LHSV of 5.0 hr$^{-1}$, and a H$_2$/oil ratio of 160 NL/L for 20 hours to obtain a super-low sulfur gas oil F. The properties of the low sulfur gas oil E and super-low sulfur gas oil F are shown in Table 2.

The density, distillation characteristics, nitrogen content, sulfur content, kinematic viscosity, color and net calorific value were respectively measured according to the methods of JIS K 2249, JIS K 2254, JIS K 2609, ASTM D5453 (ultraviolet fluorescence method), JIS K 2283, ASTM color test method of JIS K 2580 and JIS K 2279. The aromatic content was measured by the method specified in JPI-5S-49-97.

TABLE 1

|  | Straight-run gas oil A | Light catalytically cracked oil B | Thermally cracked oil C | Blended gas oil D |
|---|---|---|---|---|
| Density (15° C.) (g/cm$^3$) | 0.8520 | 0.9264 | 0.8598 | 0.8609 |
| Sulfur content (mass ppm) | 10,500 | 1,100 | 21,600 | 11,600 |
| Nitrogen content (mass ppm) | 110 | 250 | 580 | 220 |
| Distillation characteristics (° C.) |  |  |  |  |
| Initial boiling point | 252.5 | 150.5 | 174.0 | 200.5 |
| 10 vol % recovered temperature | 282.0 | 222.0 | 204.5 | 251.5 |
| 50 vol % recovered temperature | 306.0 | 264.5 | 268.5 | 298.0 |
| 90 vol % recovered temperature | 337.0 | 314.0 | 340.0 | 340.5 |
| End point | 350.5 | 334.0 | 372.5 | 365.0 |

TABLE 2

|  | Low sulfur gas oil E Raw material | Super-low sulfur gas oil F Example 1 | Super-low sulfur gas oil G Example 2 | Low sulfur gas oil H Comparative Example 1 | Low sulfur gas oil I Comparative Example 2 |
|---|---|---|---|---|---|
| Density (15° C.) (g/cm$^3$) | 0.8363 | 0.8367 | 0.8345 | 0.8363 | 0.8357 |
| Sulfur content (mass ppm) | 6.5 | 0.9 | 0.2 | 3.0 | 2.1 |
| Nitrogen content (mass ppm) | Not more than 0.5 | Not more than 0.5 | Not more than 0.5 | Not more than 0.5 | Not more than 0.5 |
| Kinematic viscosity (30° C.) (mm$^2$/s) | 4.460 | 4.449 | 4.462 | 4.413 | 4.428 |
| Color (ASTM) | L0.5 | L1.0 | L0.5 | L1.0 | L0.5 |

TABLE 2-continued

|   | Low sulfur gas oil E Raw material | Super-low sulfur gas oil F Example 1 | Super-low sulfur gas oil G Example 2 | Low sulfur gas oil H Comparative Example 1 | Low sulfur gas oil I Comparative Example 2 |
|---|---|---|---|---|---|
| Net calorific value (MJ/L) | 35.9 | 35.9 |  | 35.9 | 35.9 |
| Aromatic content (vol %) | 20.8 | 19.4 | 17.5 | 20.2 | 19.2 |
| Monocyclic aromatics | 17.4 | 16.0 | 15.5 | 16.9 | 16.8 |
| Polycyclic aromatics | 3.4 | 3.4 | 2.0 | 3.3 | 2.4 |
| Distillation characteristics (° C.) |  |  |  |  |  |
| Initial boiling point | 196.5 | 197.0 | 196.0 | 195.0 | 195.0 |
| 10 vol % recovered temperature | 243.5 | 244.0 | 242.0 | 243.0 | 241.0 |
| 50 vol % recovered temperature | 290.5 | 291.0 | 289.5 | 290.5 | 290.0 |
| 90 vol % recovered temperature | 334.5 | 336.0 | 335.0 | 335.5 | 335.0 |
| End point | 362.0 | 361.5 | 359.5 | 363.5 | 363.0 |

It can be clearly found from the results that a super-low sulfur gas oil with a sulfur content of less than 5 mass ppm can be obtained by causing a gas oil fraction to come in contract with a hydrodesulfurization catalyst containing element(s) of Group 6A and Group 8 of the periodic table in the presence of hydrogen in high pressure to obtain a low sulfur gas oil with a sulfur content of 5 to 50 mass ppm, and then desulfurizing the resulting low sulfur gas oil by causing it to come in contact with a porous desulfurization agent having a sulfur-sorbing function in the presence of hydrogen.

Example 2

A nickel-zinc complex oxide (Ni: 36 mass %, Zn: 41 mass %) prepared by the coprecipitation method was loaded in a reactor tube and subjected to a reduction treatment by flowing hydrogen gas at 300° C. for 6 hours. The low sulfur gas oil E and hydrogen were then fed to the reactor tube and reacted under the conditions of a reaction temperature of 300° C., a reaction pressure of 3.0 MPa, a LHSV of 5.0 hr$^{-1}$, and a H$_2$/oil ratio of 160 NL/L for 20 hours to obtain a super-low sulfur gas oil G. The properties of the resulting super-low sulfur gas oil G are shown in Table 2.

Comparative Example 1

CoMo/alumina (Co: 3 wt %, Mo: 13 wt %) prepared by a supporting method was loaded in a reactor tube and, as a pretreatment, presulfiding was conducted by passing gas oil containing 1 wt % of dimethyl disulfide through the reactor tube in the presence of hydrogen at 300° C. and 5 MPa. Then, the gas oil fraction E was fed to the reactor tube and reacted under the conditions of a reaction temperature of 300° C., a hydrogen partial pressure of 1.0 MPa, a LHSV of 5.0 hr$^{-1}$, and a H$_2$/oil ratio of 160 NL/L to obtain a low sulfur gas oil H. The properties of the resulting low sulfur gas oil H are shown in Table 2.

Comparative Example 2

CoMo/alumina (Co: 3 wt %, Mo: 13 wt %) was loaded in a reactor tube and, as a pretreatment, presulfiding was conducted by passing gas oil containing 1 wt % of dimethyl disulfide through the reactor tube in the presence of hydrogen at 300° C. and 5 MPa. Then, the gas oil E was fed to the reactor tube and reacted under the conditions of a reaction temperature of 300° C., a hydrogen partial pressure of 3.0 MPa, a LHSV of 5.0 hr$^{-1}$, and a H$_2$/oil ratio of 160 NL/L to obtain low sulfur gas oil I. The properties of the resulting low sulfur gas oil I are shown in Table 2.

It can be seen that the well known hydrodesulfurization methods shown in the Comparative Examples cannot be attained a sulfur content of not more than 1 mass ppm, but the treatment using the porous desulfurization agent having sulfur sorption function shown in the Examples can be attained a sulfur content of not more than 1 mass ppm.

The invention claimed is:

1. A method for producing a super-low sulfur gas oil blending component or a super-low sulfur gas oil composition comprising:
    desulfurizing a low-sulfur gas oil fraction with a sulfur content of 5 to 30 mass ppm by causing the low-sulfur gas oil fraction to come in contact with a porous desulfurization agent having a sulfur-sorbing function in the presence of hydrogen at a hydrogen/oil feed ratio of 10 to 500 NL/L to reduce the sulfur content to less than 5 mass ppm and to maintain an aromatic content of 13 to 30 mass %;
    the desulfurizing being carried out at a temperature of 200-350° C., a pressure of 10 MPa or less and a liquid hourly space velocity of 2 to 30 hr$^{-1}$; and
    the porous desulfurization agent having a sulfur-sorbing function consisting essentially of a nickel-zinc complex oxide.

2. The method according to claim 1, wherein the porous desulfurization agent having a sulfur-sorbing function is a nickel-zinc complex oxide prepared by co-precipitation.

3. A method for producing a super-low sulfur gas oil blending component or a super-low sulfur gas oil composition comprising:
    desulfurizing a low-sulfur gas oil fraction with a sulfur content of 2 to 30 mass ppm by causing the low-sulfur gas oil fraction to come in contact with a porous desulfurization agent having a sulfur-sorbing function in the presence of hydrogen at a hydrogen/oil feed ratio of 10 to 500 NL/L to reduce the sulfur content to not more than 1 mass ppm and to maintain an aromatic content of 13 to 30 mass %;
    the desulfurizing being carried out at a temperature of 200-350° C., a pressure of 10 MPa or less and a liquid hourly space velocity of 2 to 30 hr$^{-1}$; and
    the porous desulfurization agent having a sulfur-sorbing function consisting essentially of a nickel-zinc complex oxide.

4. The method according to claim 3, wherein the porous desulfurization agent having a sulfur-sorbing function is a nickel-zinc complex oxide prepared by co-precipitation.

5. A method for producing a super-low sulfur gas oil blending component or a super-low sulfur gas oil composition comprising:

desulfurizing a low-sulfur gas oil fraction with a sulfur content of 5 to 30 mass ppm by causing the low-sulfur gas oil fraction, which is obtained by causing a gas oil fraction to come in contact with a hydrodesulfurization catalyst containing element(s) of Group 6A and Group 8 of the periodic table in the presence of hydrogen, to come in contact with a porous desulfurization agent having a sulfur-sorbing function in the presence of hydrogen at a hydrogen/oil feed ratio of 10 to 500 NL/L to reduce the sulfur content to less than 5 mass ppm and to maintain an aromatic content of 13 to 30 mass %;

the desulfurizing being carried out at a temperature of 200-350° C., a pressure of 10 MPa or less and a liquid hourly space velocity of 2 to 30 $hr^{-1}$; and the porous desulfurization agent having a sulfur-sorbing function consisting essentially of a nickel-zinc complex oxide.

6. The method according to claim 5, wherein the porous desulfurization agent having a sulfur-sorbing function is a nickel-zinc complex oxide prepared by co-precipitation.

7. A method for producing a super-low sulfur gas oil blending component or a super-low sulfur gas oil composition comprising:

desulfurizing a low-sulfur gas oil fraction with a sulfur content of 2 to 30 mass ppm by causing the low-sulfur gas oil fraction, which is obtained by causing a gas oil fraction to come in contact with a hydrodesulfurization catalyst containing element(s) of Group 6A and Group 8 of the periodic table in the presence of hydrogen, to come in contact with a porous desulfurization agent having a sulfur-sorbing function in the presence of hydrogen at a hydrogen/oil feed ratio of 10 to 500 NL/L to reduce the sulfur content to 1 mass ppm or less and to maintain an aromatic content of 13 to 30 mass %;

the desulfurizing being carried out at a temperature of 200-350° C., a pressure of 10 MPa or less and a liquid hourly space velocity of 2 to 30 $hr^{-1}$; and the porous desulfurization agent having a sulfur-sorbing function consisting essentially of a nickel-zinc complex oxide.

8. The method according to claim 7, wherein the porous desulfurization agent having a sulfur-sorbing function is a nickel-zinc complex oxide prepared by co-precipitation.

* * * * *